United States Patent
Weston et al.

[15] 3,673,426
[45] June 27, 1972

[54] PHASE REVERSAL SWITCH AND/OR CIRCUIT BREAKER

[72] Inventors: Donald E. Weston, East Sebago, Maine; Raymond F. Kupetis, Chicago, Ill.

[73] Assignee: H. K. Porter Company, Inc., Chicago, Ill.

[22] Filed: March 31, 1970

[21] Appl. No.: 24,079

[52] U.S. Cl. ................................. 307/127, 290/52
[51] Int. Cl. ........................................ H01h 35/00
[58] Field of Search .................. 307/127, 147, 112, 139; 290/52

[56] References Cited

UNITED STATES PATENTS 3,372,645   3/1968   Willi ........................... 290/52 X Primary Examiner—Herman J. Hohauser
Attorney—Gary, Juettner, Pigott & Cullinan and Russell W. Pyle

[57] ABSTRACT

Apparatus for selectively connecting a rotary electric machine to an electric power distribution system for use as a generator supplying power to the system or as a motor drawing power from the system, comprising in a three phase system, a switch for the common phase, a pair of switches for each of the other two phases, and interphase means coupling one switch of each of said pairs to the opposite of said two phases, whereby machine phases A, B and C may be connected to system phases A, B and C respectively, or system phases A, B and C may be connected to machine phases B, A and C respectively; and for other phase reversing service.

Also, improved switch construction for performing the above and other functions.

11 Claims, 14 Drawing Figures

INVENTORS
DONALD E. WESTON
RAYMOND F. KUPETIS

By Gary Parker,
Juettner, Pigott & Cullinan
Att'ys

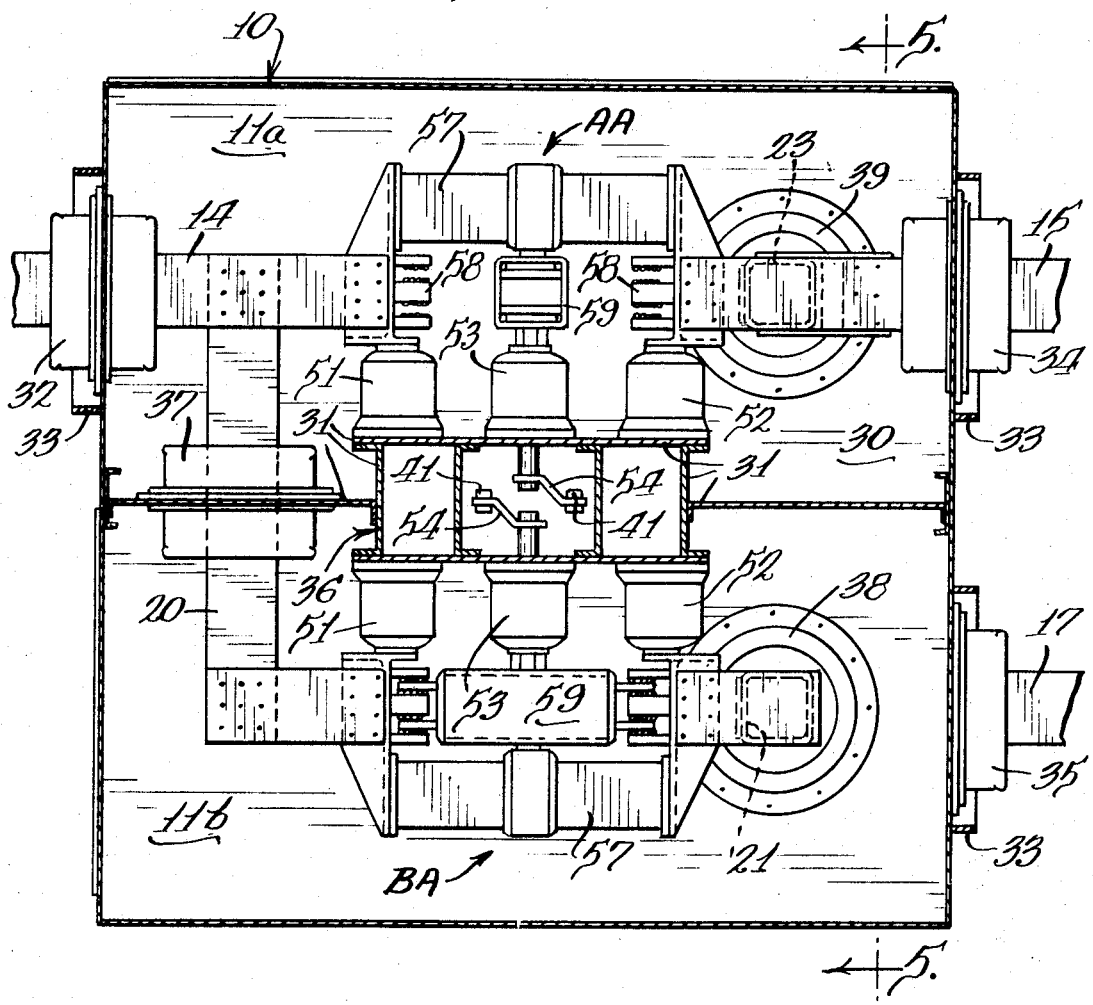

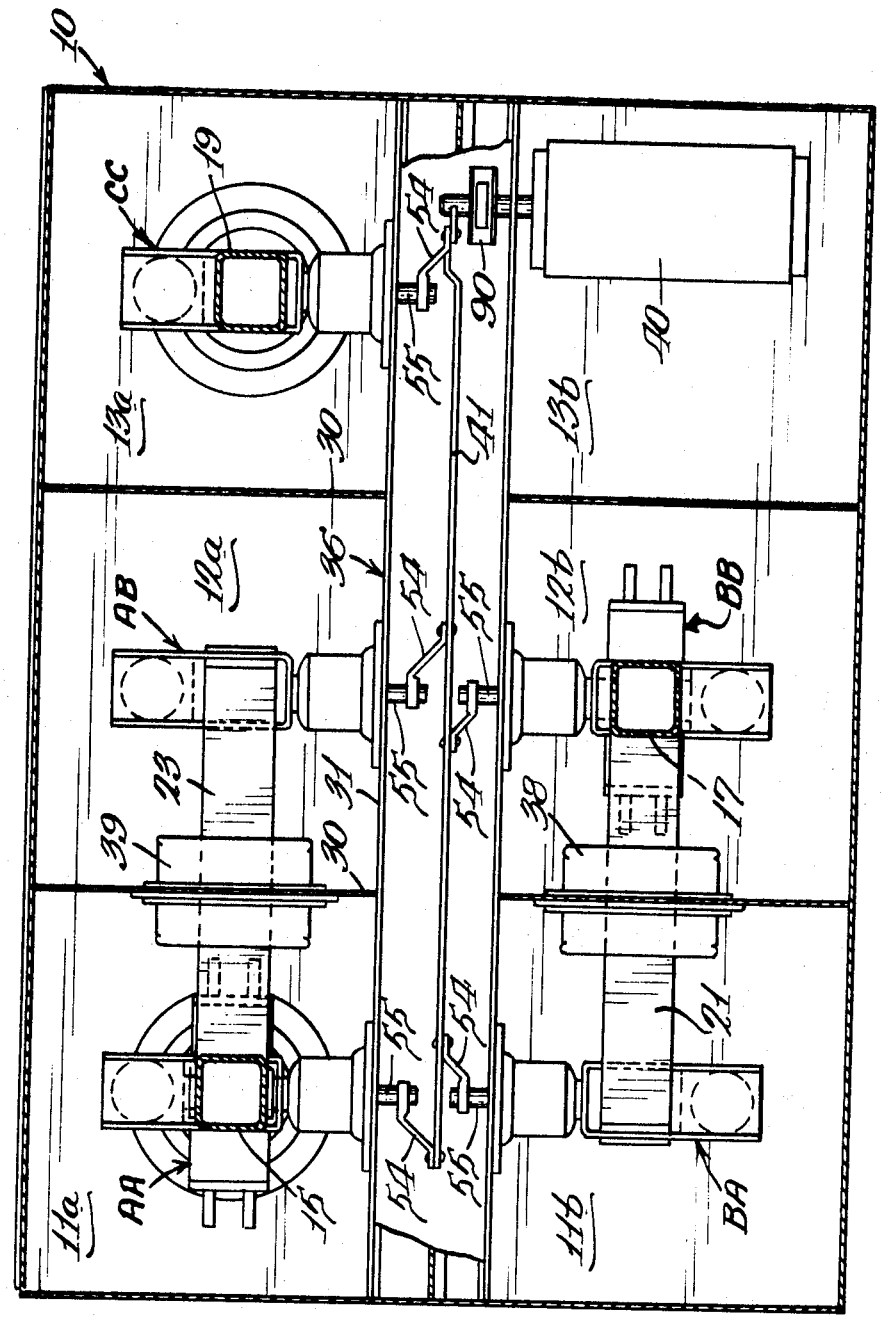

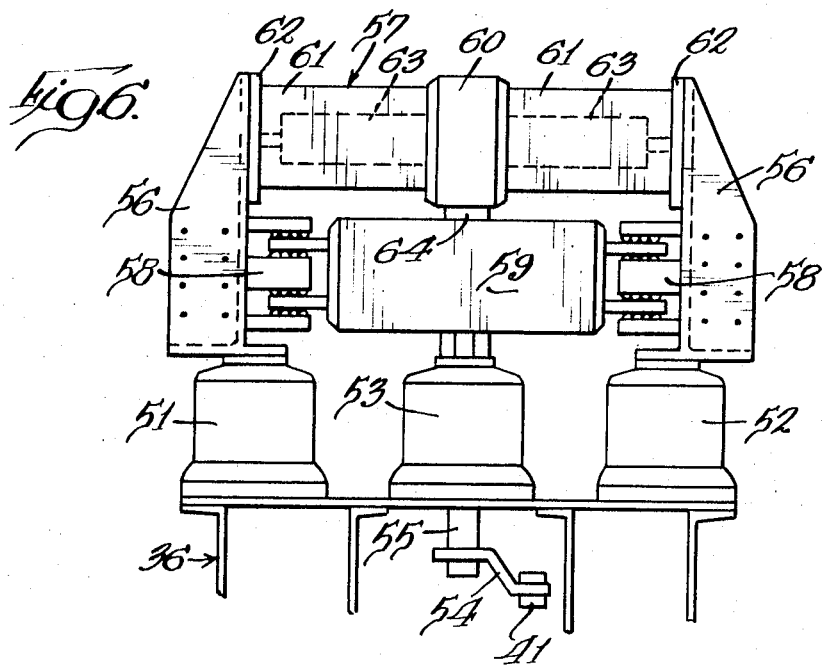
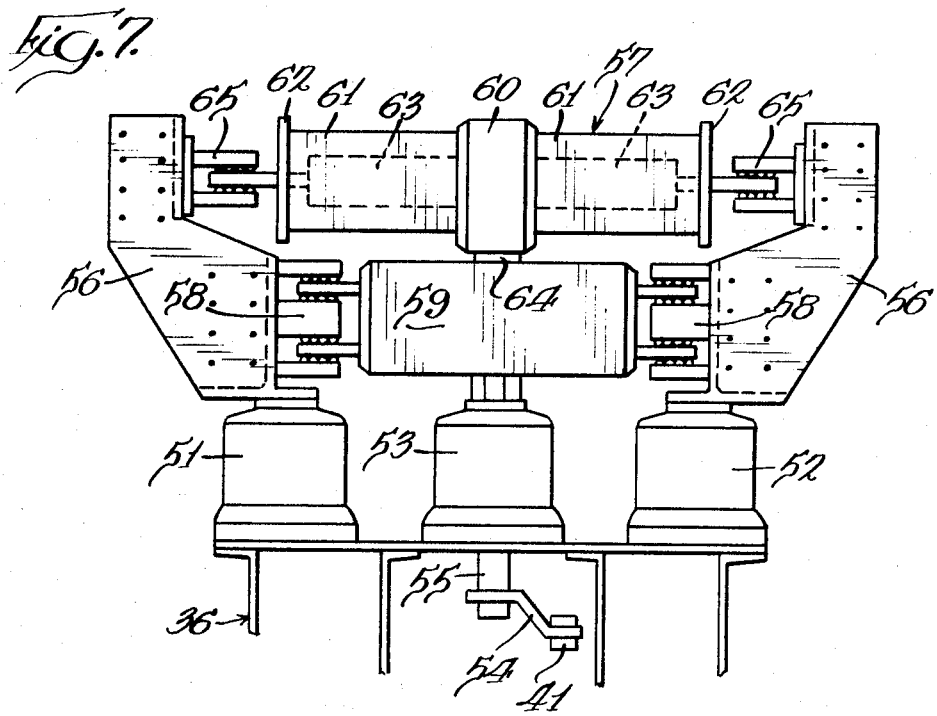

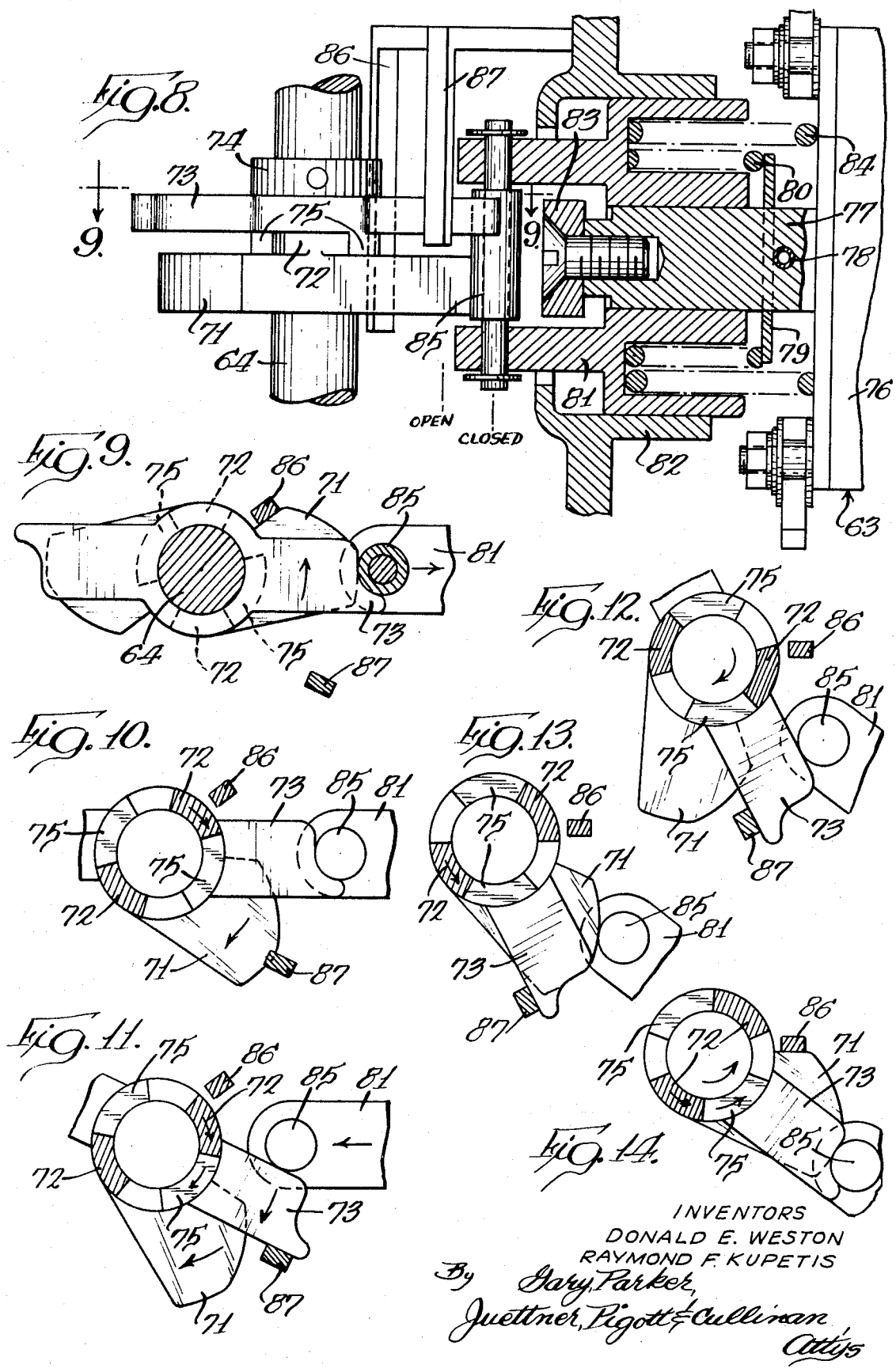

PHASE REVERSAL SWITCH AND/OR CIRCUIT BREAKER

BACKGROUND OF THE INVENTION

This invention has particular application to pumped storage generation of electric power, i.e., power installations comprised of upper level and lower level water reservoirs and an interposed generating and pumping station wherein, during "peak" electric load hours, water is drained from the upper reservoir to the lower reservoir to drive a generator for supplying supplemental power to an electric distribution system, and wherein, during "offpeak" hours, power is drawn from the system to drive a pump for pumping the water from the lower reservoir back to the upper reservoir. This invention permits a single rotary electric machine to serve both as the generator and the pump driving motor.

Heretofore, such switching has normally been done on the high voltage system side of a transformer interposed between the rotary electric machine and the system. This requires large switch gear to handle the higher voltage and consequently a large and expensive overall installation. The only means known to us for performing phase reversal switching at generator voltages and currents (14 to 23 KV and 10,000 amps) is a high cost air circuit breaker.

SUMMARY OF THE INVENTION

This invention provides phase reversal switch means of compact and economical construction designed for and operating at generated power and providing thereby significant economy in the amount of metal enclosed bus and step-up transformers required at the pumped storage installation.

The switch means is comprised of a plurality of switch structures each comprising an air break disconnect switch serving as a shunt for an assembly of vacuum tube interrupters of a number and capacity sufficient to at least interrupt if not actually break the circuit, and means for operating the components to first open the shunt switch and to then operate the vacuum tubes to interrupt or break the circuit.

One problem in the particular environment is that the generated power is at a moderate but nevertheless quite high potential (e.g., 14 to 23 KV) and of high current (e.g., 8,000 to 14,000 amps). To carry the current requires conductive components of heavy cross-section and to interrupt or break the current flow requires extremely high speed and effective interrupter or breaker means. The two requirements are the antithesis of one another in terms of switch construction because a heavy member cannot be accelerated as fast as necessary for interruption, and a light weight rapidly acceleratable member cannot continuously carry a heavy current load. This problem is resolved by the above described combination of parallel connected shunt switch means of heavy cross-section for continuous current carrying duty, and vacuum tube interrupters for momentary current carrying duty and interrupter or circuit breaker service. To accomplish its results, this invention particularly utilizes some and/or all of the underlying principles of switch construction described and claimed in co-pending application Ser. No. 775,660, filed Nov. 14, 1968, now U.S. Pat. No. 3,566,055.

An object of the invention is the provision of an extremely compact arrangement of five of the switches above described, a first one for connecting machine phase A to system phase A, a second for connecting machine phase B to system phase B, a third one for connecting machine phase A to system phase B, and a fourth one for connecting machine phase B to system phase A, and a fifth one for controlling the common phase C; together with means for operating the five switches in such correlated relationship that the first and second switches are closed at the same time and only when the third and fourth switches are open, and vice versa.

An additional object is the provision of a compact arrangement of said five switches in a segregated or isolated phase metal enclosure complementary to and cooperative with the metal enclosures of the power conducting busses served by the switch.

Other objects and advantages of the invention will become apparent in the following detailed description, as taken in conjunction with the accompanying drawings.

THE DRAWINGS

FIG. 4 is a side elevation (with the side panel removed) of a metal enclosed switch construction showing the pair of switches serving machine or pumped power phase A.

FIG. 5 is a cross-sectional view taken substantially on line 5—5 of FIG. 4 and showing the arrangement of all three phases, and the location of a switch operating mechanism.

FIG. 6 is a side elevation of a first form of switch construction for use in practice of the invention.

FIG. 7 is a similar view of an alternative form of switch construction.

FIG. 8 is a vertical longitudinal section of the central portion of the vacuum tube housing of either switch showing the vacuum tube operating means.

FIG. 9 is a sectional view taken substantially on line 9—9 of FIG. 8 and FIGS. 10 to 14 are views similar to FIG. 9 showing sequential stages in switch operation.

DESCRIPTION

Figure 1:
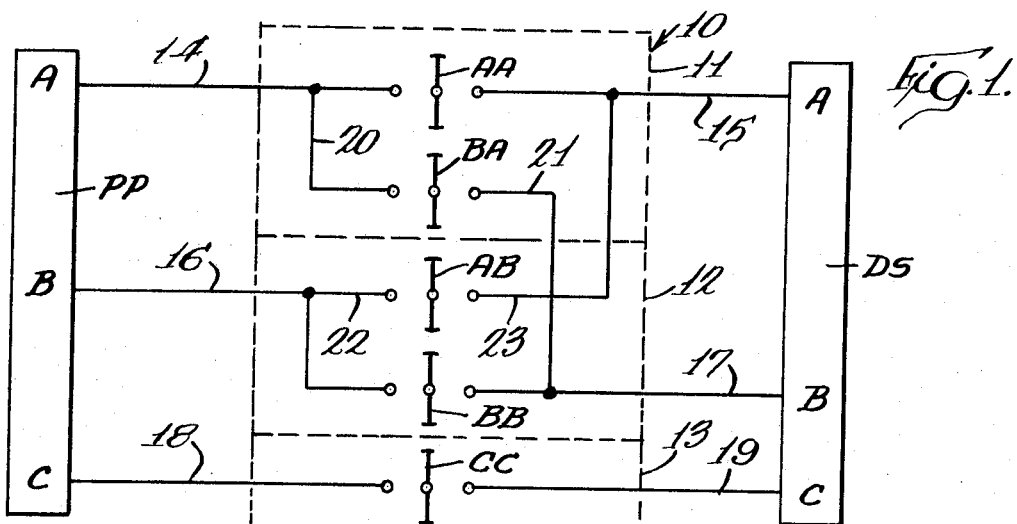
FIGS. 1, 2 and 3 are schematic circuit diagrams of the switching functions performed by the apparatus of this invention, i.e., respectively, circuit open, circuit closed to supply generated power from pumped storage to the system, and circuit closed to supply power from the system to pumped storage.

Referring to FIG. 1, a pumped power station indicated at PP is adapted to supply power to or receive power from a distribution system DS via the metal enclosed switch assembly 10 of this invention. The metal enclosure of the switch is preferably phase segregated into compartments 11, 12 and 13 corresponding to phases A, B and C of the station PP and the system DS.

Figure 2:
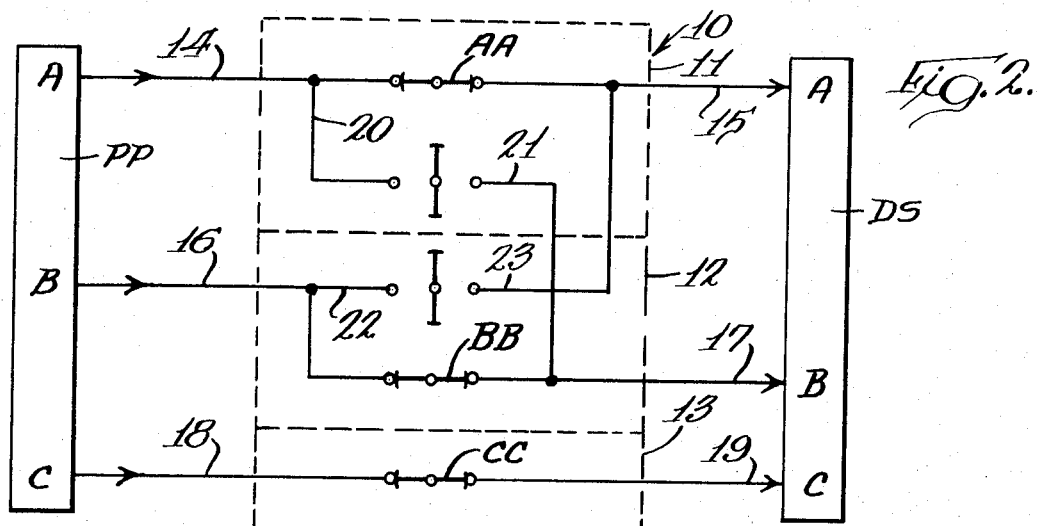

The phase A compartment 11 is provided with an input lead 14, an output lead 15 and a switch AA for interconnecting station phase A to system phase A as shown in FIG. 2. Similarly, the phase B compartment 12 is provided with input lead 16, an output lead 17 and a switch BB for interconnecting station phase B and system phase B as shown in FIG. 2. Common phase C similarly has leads 18 and 19 and a switch CC for interconnecting said leads.

In addition, station phase A lead 14 and system phase B lead 17 are adapted to be interconnected under the control of a switch BA via interphase connections 20 and 21; and station phase B lead 16 and system phase A lead 15 are adapted to be interconnected under the control of the switch AB via interphase connections 22 and 23.

Figure 3:
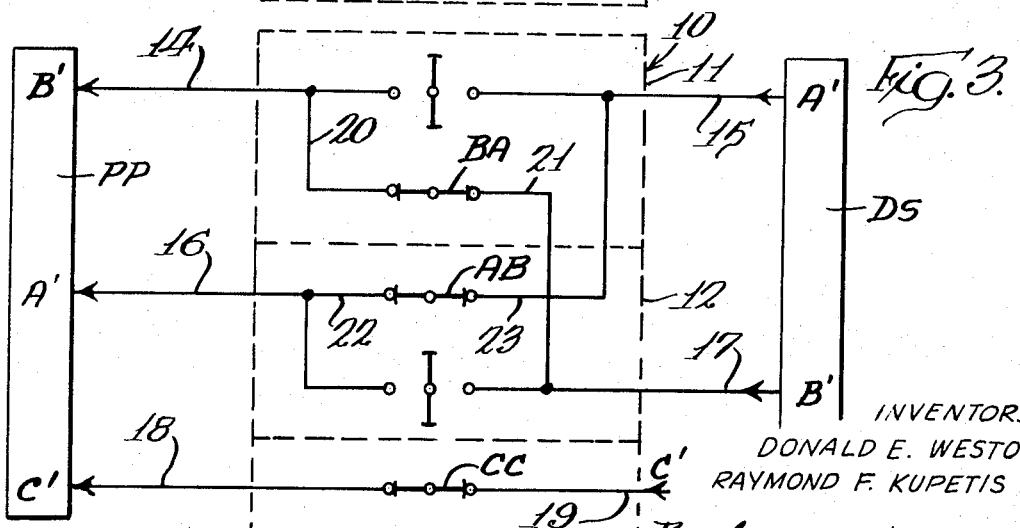

Consequently, as shown in FIG. 2, switches AA, BB and CC may be closed (when switches BA and AB are open) to supply power from the generator of the station PP to the system DS during "peak" load hours or in the event of emergency. Then, when the system load is "offpeak", the switches AA, BB and CC may be opened as shown in FIG. 1 whereafter switches BA, AB and CC may be closed as illustrated in FIG. 3 for the supply of power from the system to the generator at reversed phase (as indicated by the primed letters A, B, C) to cause the same to operate as a motor for driving pumps for transferring water back uphill from the lower to the higher reservoir.

The preferred form of switch for the described purpose is shown in FIG. 6, and the compact assembly and metal enclosure of the five switches and the operating mechanism therefor is shown in FIGS. 4 and 5. As illustrated in the latter Figures, the enclosure 10 comprises a metallic box-like housing having two vertical partitions 30 therein dividing the enclosure into three phase components 11, 12 and 13; and the housing preferably is further divided by a horizontal partition 31 into six individual cubicles 11a, 11b, 12a, 12b, 13a and 13b. The partitions 30 and 31 may be either single walled to provide a segregated phase relationship or double walled to provide an isolated phase relationship.

The pumped power station bus leads 14, 16 and 18 enter into the upper cubicles 11a, 12a and 13a (from the left side of FIG. 4 and the rear side of FIG. 5 — herein sometimes called the input side) through suitable insulated bushings 32, and the enclosure 10 is provided at each such location with a collar 33 for attachment thereto of the bus enclosure (not shown). The distribution system bus leads 15 and 19 for phases A and C thereof, similarly enter into upper cubicles 11a and 13a through bushings 34, but the phase B lead 17 enters lower cubicle 12b through bushing 35; all of said points of entry being provided with bus enclosure mounting collars 33.

Compartments 11 and 12 each mount therein a double switch assemblage comprised of an upper switch AA and AB, respectively, mounted in upright position in the respective upper cubicle 11a, 12a, and a lower switch BA and BB, respectively, mounted in inverted position in the respective lower cubicle 11b–12b; the switches of each assemblage being mounted on a common base 36 connected to and forming part of the horizontal partition structure 31.

At the station side of cubicle 11a, the branch connector 20 is secured to the station phase A bus lead 14 and extends downward through the partition 31 within a bushing 37 into the cubicle 11b where it is connected to one terminal of the switch BA. The interphase connector 21 extends from the other terminal of switch BA at the system side of the cubicle 11b horizontally through the partition 30 via bushing 38 into the cubicle 12b where it is connected to the system phase B bus lead 17. In similar fashion, the interphase connector 23 extends horizontally between cubicles 11a and 12a via bushing 39 to interconnect the terminal of switch AB to the system phase A bus lead 15 at the system side of the enclosure.

The switch CC for common phase C is, of course, a single switch and it is mounted in upright position in cubicle 13a. Electrical connections not specifically described in conjunction with FIGS. 4 and 5, such as those to switch CC, will be manifest from FIGS. 1 to 3, provided however, that all such connections are formed by bus-type conductors capable of carrying the generated current, such as the ventilated square tube bus shown in FIGS. 4 and 5.

The remaining cubicle 13b of the enclosure 10 provides an ideal location for an operating mechanism 40 for the five switches, the mechanism being connected to the switches by operator bars 41 extending through the hollow space defined within the base 36 of the switch structures. Convenient access to the equipment within the enclosure is provided by doors (not shown in detail) at the station side of cubicles 11b, 12b and 13b, at the system side of cubicles 11b, 12a and 13b, and at the end walls of the enclosure 10.

The individual switches for the system are preferably of the type shown in FIG. 6. Each of the switches is mounted on a stationary base 36 and comprised of three mounting insulators, namely, stationary outboard insulators 51 and 52 and a rotary central insulator 53 journaled on the base 36 and adapted to be operated by a crank arm 54 connecting a depending shaft extension 55 to the operating bar 41.

The outboard insulators 51 and 52 mount the stationary contact assemblies of the switch, which in this case are comprised of a pair of metallic stanchions 56 each fixedly mounting a respective end of a vacuum tube assembly 57 and also mounting a stationary contact 58 for a rotatable, double break switch blade 59 comprising a shunt for the vacuum tube assembly 57. This shunt switch blade is mounted on top of the rotatable insulator 53 immediately below the vacuum tube assembly 57.

The shunt blade 59 is simply a cylindrical conductive tube closed at its ends and provided with thick walls and contact fingers generally correlated to the cross-sectional area of the bus connectors leading to the switch and sufficient to carry continuously the current of the system. The blade is secured centrally of its length to the insulator 53 so as to be rotated thereby in such fashion that its opposite ends swing away from both of the contacts 58–58 simultaneously and to equal degrees, whereby to provide two points of contact separation for inserting a large air gap between the contacts 58–58. The blade is of such length that when rotated approximately 45° to 55°, the air gaps between it and the contacts 58 will be sufficient to prevent re-striking of an arch therebetween at the potential of the system.

The vacuum tube assembly 57 comprises a central operator section 60 of generally cylindrical configuration, a pair of insulator sections 61 extending to opposite sides of the central section, and conductive end bells 62 secured to the stanchions or stationary contact members 56. Mounted within each insulator 61 is one or more vacuum tube units of conventional construction. All of the vacuum tubes are connected in series circuit between the end bells 62, preferably in conjunction with a voltage distributing and equalizing linkage for causing all of the vacuum tubes to break simultaneously. For a more detailed discussion, reference may be had to co-pending application, Ser. No. 775,660 (U.S. Pat. No. 3,566,055). In the particular environment here considered, each insulator may carry a single 15 KV vacuum tube 63 surrounded by air at ambient pressure and temperature, the two tubes being connected in series between the bells 62 and mounted in back-to-back relation.

In operation of the switch, the crank 54 is turned by the bar 41 to rotate the insulator 53 and thus the shunt blade 59. When the blade has been rotated to a predetermined degree to establish the necessary air gaps between it and the contacts 58, the vacuum tubes 63 are tripped to open circuit position by means of a shaft 64 extending from the blade 59 upwardly into the central section 60 of the vacuum tube assembly. This causes the circuit to be interrupted or broken. As explained in conjunction with application Ser. No. 775,660 (U.S. Pat. No. 3,566,055), the vacuum tubes until this time have been shunted by the blade 59, have had only momentary current carrying duty and thus are in prime condition to perform the circuit interrupting or breaking function. As will be subsequently described, other advantages of the circuit breaker assembly of said co-pending application may be embodied in the switches used in this invention, particularly the feature of isolating the vacuum tubes from the circuit following circuit breaker duty. However, in the environment here considered, the vacuum tubes can perform effectively without isolation and many simplifications of physical structure result from fixed mounting of the assembly 57. Thus, the switch of FIG. 6 is presently preferred.

However, if desired, the switches could be of structure commensurate with the disclosures of applications Ser. No. 775,660 (U.S. Pat No. 3,566,055) and Ser. No. 119,511 filed Mar. 1, 1971. For purposes of giving an example, there is shown in FIG. 7 a modification of the switch of FIG. 6 wherein the vacuum tube assembly 57 is also mounted for rotation and contacts 65 are mounted on the stanchions 56 for cooperation with contacts provided on the end bells 62.

An operating mechanism for the vacuum tube assembly 57 is shown in FIGS. 8 and 9, and sequential positions in the operation thereof are depicted fragmentarily in FIGS. 9 through 14. Referring to FIGS. 8 and 9, the shaft 64 extending upward from the disconnect or shunt blade 59 is provided within the central section 60 of the assembly 57 with a cam 71 intended primarily for closing the vacuum tubes. The hub portion of the cam includes a pair of upwardly extending spaced abutments 72. Rotatably mounted on the shaft 64 above the cam 71 is a rotary latch 73, the latch being trapped on the shaft proximate to the cam by a collar 74 secured to the shaft. The hub portion of the latch 73 is equipped with a pair of abutments 75 extending toward the cam 71 and complemental to the abutments 72 on the cam. The circumferential dimensions of the two pairs of abutments 72 and 75 are such as to provide a predetermined spacing between opposing abutments providing a lost motion rotary connection between the cam and latch correlated to the degree of disconnect or shunt switch rotation desired prior to tripping of the vacuum tubes, in this case approximately 40° to 45°.

Both the cam 71 and the latch 73 are elongate members having cam and latch surfaces (respectively) at the opposite ends thereof for cooperation with the vacuum tube switch means mounted in each of the insulators 61, only one of which is shown in FIG. 8. Each vacuum tube comprises a stationary tubular housing 76 containing a stationary contact (not shown) and a movable contact rod 77 extending from the tube and equipped to the exterior thereof with a transverse pin 78. Engaged with the pin is a collar 79 which is contacted by a compression spring 80 disposed between the collar and an operator 81 which is slidably mounted in a tubular guide and stop member 82 which may be bolted or otherwise secured to the tube 76 and the central section 60. The operator 81 is also slidably guided on the inner end of the contact rod 77, and a headed bolt 83 adjustably threaded into the inner end of the contact rod 77 serves to trap the operator 81 on the rod 77 with facility for adjustment of lost motion between the operator and the head 83. An operator driving compression spring 84 is confined between the tube 76 and the operator 81 in encircling relation to the spring 80.

Inwardly of the head 83, the operator 81 is equipped with a transversely mounted roller bearing 85 which parallels the shaft 64 for cooperation with the cam 71 and the latch 73. Also disposed for cooperation with the cam and latch are a pair of abutments projecting from the housing section 60, namely, a closing direction abutment 86 extending into the path of the cam 77 on the closing side of the vacuum tube center line, and an opening direction abutment 87 extending into the path of the latch 73 on the opening side of the vacuum tube center line and spaced from the adjacent side of the latch by an angle equal to the rotary movement of the shaft 64 prior to tripping of the vacuum switches.

These two abutments 86 and 87 are provided for the purpose of rotating the vacuum tube assembly 57 to isolated position and thus are applicable solely to the FIG. 7 embodiment of the switch. They are not necessary in the FIG. 6 embodiment. However, for convenience of disclosure they have been shown in FIGS. 9 to 14 to facilitate description of latch mechanisms for both switch embodiments without unnecessary duplication. Moreover, as applied to FIG. 7 and with regard to the presence of the above abutments 86 and 87, the description is given by way of example and not as the preferred structure for isolation of the vacuum switch assembly 57. In the latter regard, reference is made to said copending applications.

In the closed position of the switch, as shown in FIG. 9, the cam 71 and the latch 73 are in line with the vacuum tubes and the latch is engaged with the roller 85 to retain the vacuum tubes closed. At this time, the operator 81 closes the vacuum tube switch under predetermined spring pressure by virtue of the interposition of the compression spring 80, whereby to maintain a predetermined contact pressure between the vacuum tube contacts.

Upon opening movement of the rotary insulator 53 and shaft 64, the shunt or disconnect switch 59 is first rotated to swing clear of its contact by an arcuate extent of 40° to 45°, during which the cam 71 is rotated to clear the bearing 85 and to engage its abutments 72 with the abutments 75 on latch 73, the latch still retaining the vacuum tube switches closed as shown in FIG. 10.

During the next 10° to 15° of shaft rotation, the cam 71 drives the latch 73 in opening direction, whereupon the latch releases the roller 85 and the spring 84 drives the operator 81 to switch open position, as shown in FIG. 11, at which time the shunt or disconnect switch has been opened about 55° – 60°. During opening movement, the spring 84 initially drives only the operator 81 whereby to accelerate the same to high speed, and during this time, the pressure on spring 80 is alleviated due to retraction of the operator 81. Then, the spring 84 drives the now accelerated operator against the head 83, with impact load to break any welding of the vacuum tube contacts, whereupon the contact rod 77 is snapped to full open position and the vacuum tube contacts are separated at a defined controlled rate whereby to insure effective interruption or breaking of the circuit, i.e., opening of the circuit.

In the FIG. 6 embodiment, assuming absence of the abutments 86 and 87, the shaft 64, cam 71 and latch 73 would then simply rotate to a full open position where the shunt or disconnect switch 59 is at right angles to the vacuum tube assembly 57, as shown for switch AA in FIG. 4.

In the FIG. 7 embodiment, however, as soon as the latch 73 has been moved sufficiently to trip the vacuum switches, the latch engages the abutment 57 and continued rotation of the shaft thereupon causes the housing 60 and thus the vacuum assembly 57 to rotate with the shaft to a sufficient arcuate extent to fully isolate the vacuum tubes from the circuit, i.e., to completely separate them physically from all electrical connections. In the illustration of FIG. 12, a suitable open position is given as one wherein the shunt has been rotated 110° – 120° and the vacuum tube assembly 55° – 60°.

When it is desired to close the switch, the insulator 53 and shaft 64 are rotated in the opposite direction, whereupon the shunt switch 59 and the cam 71 first rotate approximately 40° to 45° back toward closed position, during which the cam 71 will reclose the vacuum tube contacts as indicated in FIG. 13. Then, the abutments 72 on the cam 71 engage the abutments 75 on the latch 73 and swing the latch into latching position relative to the roller 85 as is shown in FIG. 14. At this time also, the cam 71 engages the abutment 86 whereupon continued rotation caused both the vacuum assembly 57 and the shunt switch 59 to be rotated back to the switch closed position shown in FIG. 9. The electrical closing stress is carried by the shunt switch by means of appropriate contact design.

Having thus described the purpose and function of the cam 71, latch 73, and abutments 86 and 87, it will be apparent that the two switches 57 and 59 could be operated individually from the base 36 of the switch assembly by means of concentric shafts, i.e., the insulator 53 and a shaft extending axially through the insulator and the shunt 59 and into the housing 60. Also, the use of concentric shafts would permit the shunt to be mounted above the vacuum tube assembly 57 for operation by the inner one of the two shafts; in which case in the FIG. 6 structure the inner shaft could do the same work as the shaft 64 in its passage through the vacuum tube assembly, and in which case, in the FIG. 7 embodiment the assembly 57 could be operated individually by the insulator 53. The two shaft structure would aid in providing even greater assurance of avoidance of electrical stress on the vacuum tubes, especially switch closing stresses, in accordance with the teachings of application Ser. No. 775,660 (U.S. Pat. No. 3,566,055).

Considering the above described operation of the individual switches, and referring again to FIGS. 4 and 5, the operating mechanism for the five switches for the phase reversal assembly comprises the drive 40, a first bar 41 for operating switches AA, BB and CC as a group, a second bar 41 for operating switches BA, AB and CC as a group, and means 90 on the operator 40 serving as an interlock and preventing closing of switches AA and BB when switches BA and AB are closed, and vice versa. Preferably the operator 40 has a neutral switch open position, is rotatable clockwise from that position to close switches AA, BB and CC and is rotatable counterclockwise from said position to close switches AB, BA and CC; the interlock 90 including suitable means such as clutches for selectively engaging the respective bars 41 upon rotation of the operator to opposite sides of neutral. Thus, the operator provides the three switch positions depicted in FIGS. 1 through 3, and no others.

Also, especially with the switch structure of FIG. 6, it may prove feasible in some instances to interconnect the central insulators 53 of the switch pairs AA–BA and AB–BB with the shunts 59 thereof at right angles to one another and to drive the same by a single operator bar 41, whereby to provide a first closed position for switches AA and BB, a second closed position for switches BA and AB spaced 90° from said first position, and an intermediate open position for all of the switches.

Thus, while we have shown and described what we regard to be the preferred embodiment of our invention, the additional examples given render manifest the ability of persons skilled in the art to make changes, rearrangements modifications in the preferred embodiment without departing from the scope of the invention, as defined by the appended claims.

What is claimed is:

1. Phase reversing switch means comprising, in combination in a three phase system, a first switch for the common phase, a pair of switches for each of the other two phases, each pair of switches being connected at one side to the respective phase and having one switch connected at its other side to said respective phase, and interphase connector means coupling the other side of the other switch of each of said pairs to the opposite of said two phases, each of said switches comprising shunt switch means for normally carrying the load of the circuit and vacuum tube switch means operable upon opening of said shunt switch means for momentarily carrying the load of the circuit and then opening the circuit, means for operating said first switch and a first one of the switches of each pair as a first group and for operating said first switch and the second one of the switches of each pair as a second group, and interlock means for retaining said first switches of said pairs in open circuit position when said second switches of said pairs are in closed circuit position and vice versa.

2. The switch means of claim 1 including means for totally isolating the vacuum tube switch means of each switch from the circuit subsequent to operation thereof for opening the circuit.

3. Phase reversing switch means comprising, in combination in a three phase system, a first switch for the common phase, a pair of switches for each of the other two phases, each pair of switches being connected at one side to the respective phase and having one switch connected at its other side to said respective phase, and interphase connector means coupling the other side of the other switch of each of said pairs to the opposite of said two phases, each of said switches comprising spaced stationary contacts, insulated housing means bridging between said contacts, vacuum tube switch means in said housing means electrically connected between said contacts, shunt switch means normally bridging between said contacts, and means for first opening said shunt switch means, then opening said vacuum switch means and then swinging all of said switch means into spaced relation to said contacts.

4. Phase reversing switch means comprising, in combination in a three phase system, a first switch for the common phase, a pair of switches for each of the other two phases, each pair of switches being connected at one side to the respective phase and having one switch connected at its other side to said respective phase, and interphase connector means coupling the other side of the other switch of each of said pairs to the opposite of said two phases, each of said switches comprising a pair of spaced stationary contacts, an insulated housing bridging between said contacts, vacuum tube switch means in said housing electrically connected between said contacts, shunt switch means normally bridging between said contacts parallel to and external of said housing, and means for rotating said shunt switch means about an axis perpendicular thereto and centrally between said stationary contacts for swinging said shunt switch means away from said stationary contacts, said means having connection with said vacuum tube switch means centrally of said housing for operating said vacuum tube switch means to open circuit position subsequent to swinging said shunt switch means to open circuit position.

5. The switch means of claim 4, said means upon reverse swinging movement of said shunt switch means closing said vacuum tube switch means and engaging said shunt switch means with said contacts in leading relationship to the closing of said vacuum tube switch means between said stationary contacts whereby to relieve said vacuum tube switch means from circuit closing stresses.

6. The switch means of claim 4 including means for rotating said housing about said axis away from said stationary contacts subsequent to opening of said vacuum tube switch means to isolate said vacuum tube switch means from the circuit.

7. Phase reversing switch means comprising a first vertical pair of switches both having connection at one terminal thereof with a first phase input lead, a second vertical pair of switches parallel to said first pair and both having connection at one terminal thereof to a second phase input lead, an interphase connection between the other terminals of the upper switches of the two pairs, an interphase connection between the other terminals of the lower switches of the two pairs, the upper switch of one of said pairs having its said other terminal connected to an output lead for one of the two phases and the lower switch of the other pair having its said terminal connected to an output lead for the other of the two phases, a common phase switch mounted adjacent and parallel to the second pair of switches at the level of the output lead from the first pair of switches and having its terminals connected to input and output leads, and means including an operator vertically aligned with said common phase switch for operating said upper switch of said one pair, said lower switch of said other pair and said common phase switch as one group and for operating the lower switch of said one pair, the upper switch of said other pair and said common phase switch as a second group.

8. The switch means of claim 7, said operator means including interlock means accommodating closing of either group of switches only when the other group is open.

9. The switch means of claim 7, including an enclosure for the switches having vertical partitions separating the two pairs of switches and the common phase switch from the second pair and horizontal partitions separating the switches of each pair and the common phase switch from the operator, whereby each switch and the operator are enclosed in individual cubicles.

10. The switch means of claim 9, said enclosure and its partitions being metal and having at each point of ingress and egress of input and output leads a bushing for receiving the lead and a surrounding collar for attachment of the lead enclosure.

11. The switch means of claim 9 said enclosure and its partitions being of double wall construction and formed of electrically conductive material to provide an isolated phase assembly of said switches.

* * * * *